United States Patent
Anand et al.

(10) Patent No.: US 10,050,833 B2
(45) Date of Patent: Aug. 14, 2018

(54) METHOD OF REDUCING LATENCY IN A FLEXIBLE PARSER AND AN APPARATUS THEREOF

(71) Applicant: CAVIUM, INC., San Jose, CA (US)

(72) Inventors: Vishal Anand, Saratoga, CA (US); Tsahi Daniel, Palo Alto, CA (US); Gerald Schmidt, San Jose, CA (US)

(73) Assignee: Cavium, Inc., San Jose, CA (US)

( * ) Notice: Subject to any disclaimer, the term of this patent is extended or adjusted under 35 U.S.C. 154(b) by 0 days.

(21) Appl. No.: 14/309,773

(22) Filed: Jun. 19, 2014

(65) Prior Publication Data

US 2015/0372860 A1 Dec. 24, 2015

(51) Int. Cl.
*H04L 12/24* (2006.01)
*H04L 29/06* (2006.01)

(52) U.S. Cl.
CPC .......... *H04L 41/083* (2013.01); *H04L 69/22* (2013.01)

(58) Field of Classification Search
None
See application file for complete search history.

(56) References Cited

U.S. PATENT DOCUMENTS

| | | |
|---|---|---|
| 5,781,729 A | 7/1998 | Baker et al. |
| 5,951,651 A | 9/1999 | Lakshman |
| 6,088,356 A | 7/2000 | Hendel et al. |
| 6,606,301 B1 | 8/2003 | Muller et al. |
| 6,831,917 B1 | 12/2004 | Cheriton |
| 6,952,425 B1 * | 10/2005 | Nelson ............... H04L 67/327 370/407 |
| 7,017,162 B2 | 3/2006 | Smith |
| 7,293,113 B1 | 11/2007 | Krishsna |
| 7,367,052 B1 | 4/2008 | Desanti |
| 7,391,735 B2 * | 6/2008 | Johnson ............... G06F 9/546 370/246 |
| 7,606,263 B1 | 10/2009 | Parker |
| 7,710,959 B2 | 5/2010 | Ramasamy et al. |
| 7,715,611 B2 | 5/2010 | Eaton et al. |
| 7,822,032 B1 | 10/2010 | Parker et al. |
| 8,031,640 B2 | 10/2011 | Mitsumori |
| 8,054,744 B1 | 11/2011 | Bishara et al. |
| 8,112,800 B1 | 2/2012 | Yang et al. |
| 8,144,706 B1 | 3/2012 | Daniel et al. |
| 8,576,173 B2 | 11/2013 | Verhaegh |
| 8,705,533 B1 | 4/2014 | Venkatraman |

(Continued)

*Primary Examiner* — Rina C Pancholi
(74) *Attorney, Agent, or Firm* — Haverstock & Owens LLP (57) ABSTRACT

Embodiments of the apparatus for reducing latency in a flexible parser relate to an implementation that optimizes each parser engine within the parser. A packet enters the parser. Each of the parser engines processes the packet if processing is required. Otherwise, the parser engine simply forwards the packet through without processing the packet, thereby reducing latency. Each parser engine includes a memory. The memory stores bypass data and status information that indicates whether parsing for this packet is completed and, thus, no further processing is required by subsequent parser engines. Each parser engine also includes a counter, which is incremented whenever a packet enters the parser engine and is decremented whenever a packet exists the parser engine. A packet bypasses the parser engine based on the counter of the parser engine and the status information of that packet.

24 Claims, 5 Drawing Sheets

(56) References Cited

U.S. PATENT DOCUMENTS

| | | |
|---|---|---|
| 8,804,733 B1 | 8/2014 | Safrai |
| 9,064,058 B2 | 6/2015 | Daniel |
| 9,313,115 B2 | 4/2016 | Kamerkar et al. |
| 2001/0050914 A1 | 12/2001 | Akahane et al. |
| 2002/0009076 A1 | 1/2002 | Engbersen |
| 2002/0062394 A1 | 5/2002 | Bunn et al. |
| 2002/0076142 A1 | 6/2002 | Song |
| 2002/0083210 A1* | 6/2002 | Harrison ............ G06F 17/3061 719/310 |
| 2002/0163935 A1 | 11/2002 | Paatela et al. |
| 2003/0037154 A1 | 2/2003 | Poggio et al. |
| 2003/0152078 A1 | 8/2003 | Henderson et al. |
| 2003/0193949 A1 | 10/2003 | Kojima et al. |
| 2003/0210702 A1 | 11/2003 | Kendall |
| 2003/0218978 A1 | 11/2003 | Brown |
| 2003/0231625 A1 | 12/2003 | Calvignac et al. |
| 2004/0064589 A1 | 4/2004 | Boucher et al. |
| 2005/0076228 A1 | 4/2005 | Davis |
| 2005/0213570 A1 | 9/2005 | Stacy et al. |
| 2005/0232303 A1* | 10/2005 | Deforche ............ H04L 49/90 370/469 |
| 2005/0276230 A1 | 12/2005 | Akahane et al. |
| 2005/0281281 A1* | 12/2005 | Nair .................... G06F 9/45508 370/419 |
| 2006/0168309 A1 | 7/2006 | Sikdar et al. |
| 2006/0215695 A1 | 9/2006 | Olderdissen |
| 2007/0078997 A1 | 4/2007 | Stern |
| 2008/0008159 A1 | 1/2008 | Bourlas et al. |
| 2009/0067446 A1* | 3/2009 | Lee ..................... H04L 49/351 370/419 |
| 2009/0234818 A1* | 9/2009 | Lobo ................. G06F 17/30719 |
| 2009/0238190 A1 | 9/2009 | Cadigan, Jr. et al. |
| 2010/0272125 A1 | 10/2010 | Franke et al. |
| 2010/0329255 A1 | 12/2010 | Singhal |
| 2011/0040923 A1* | 2/2011 | Ren ..................... H04L 49/90 711/5 |
| 2011/0058514 A1 | 3/2011 | Lee et al. |
| 2011/0134920 A1 | 6/2011 | Dyke |
| 2011/0142070 A1 | 6/2011 | Lim et al. |
| 2011/0261698 A1 | 10/2011 | Kamerkar et al. |
| 2011/0261812 A1 | 10/2011 | Kini et al. |
| 2011/0268123 A1 | 11/2011 | Kopelman et al. |
| 2013/0039278 A1 | 2/2013 | Bouazizi et al. |
| 2013/0163427 A1 | 6/2013 | Beliveau et al. |
| 2013/0163475 A1 | 6/2013 | Beliveau et al. |
| 2013/0195457 A1* | 8/2013 | Levy .................. H04L 47/283 398/66 |
| 2013/0215906 A1 | 8/2013 | Hidai |
| 2013/0238792 A1 | 9/2013 | Kind et al. |
| 2014/0078902 A1* | 3/2014 | Edsall ................. H04L 49/253 370/232 |
| 2014/0119231 A1 | 5/2014 | Chan et al. |
| 2014/0153443 A1 | 6/2014 | Carter |
| 2014/0269307 A1 | 9/2014 | Banerjee et al. |
| 2014/0328354 A1 | 11/2014 | Michael |
| 2014/0369365 A1 | 12/2014 | Denio et al. |
| 2015/0081726 A1* | 3/2015 | Izenberg ........... G06F 17/30943 707/755 |
| 2015/0189047 A1 | 7/2015 | Naaman et al. |
| 2015/0222533 A1 | 8/2015 | Birrittella et al. |
| 2015/0277911 A1 | 10/2015 | Khartikov et al. |
| 2017/0048144 A1 | 2/2017 | Liu |

\* cited by examiner

METHOD OF REDUCING LATENCY IN A FLEXIBLE PARSER AND AN APPARATUS THEREOF

FIELD OF INVENTION

The present invention relates to network packets. In particular, the present invention relates to a method of reducing latency in a flexible parser and an apparatus thereof.

BACKGROUND OF THE INVENTION

Figure 1:
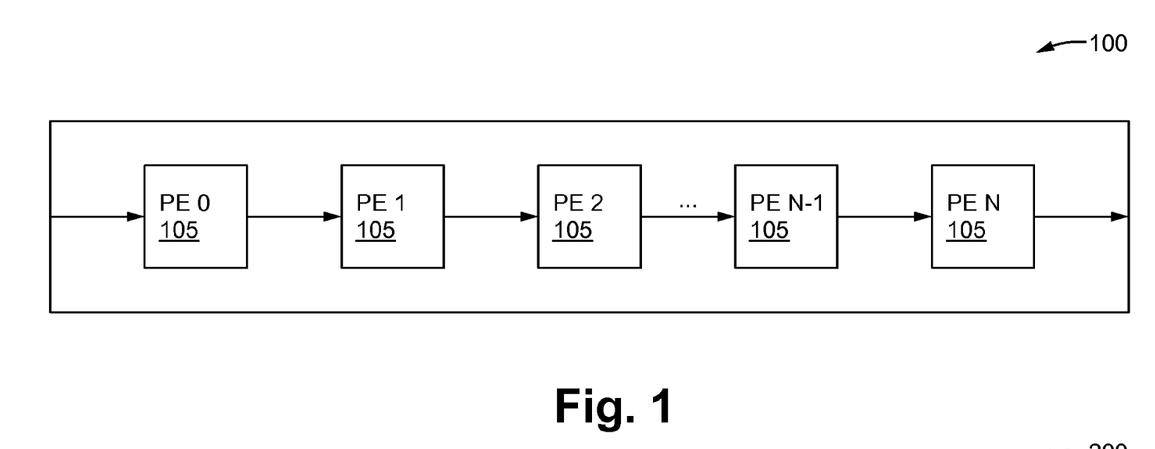
FIG. 1 illustrates a block diagram of a parser.

FIG. 1 illustrates a block diagram of a parser 100. As shown in FIG. 1, the parser 100 includes N parser engines 105 placed in series. The N parser engines 105 placed in series allows the parser 100 to parse at a high line rate. A network packet entering the parser 100 is processed by each of the N parser engines 105. Each parser engine 105 has some latency through it. Thus, if each parser engine 105 has a latency of T cycles, there is the total latency N*T clocks through the parser 100. Each network packet that goes through the parser 100 will incur this fixed latency. However, in networking, not all packets require all the processing that is provided by the multiple parser engines 105.

BRIEF SUMMARY OF THE INVENTION

Embodiments of the apparatus for reducing latency in a flexible parser relate to an implementation that optimizes each parser engine within the parser. A packet enters the parser. Each of the parser engines processes the packet if processing is required. Otherwise, the parser engine simply forwards the packet through without processing the packet, thereby reducing latency. Each parser engine includes a memory. The memory stores bypass data and status information that indicates whether parsing for this packet is completed and, thus, no further processing is required by subsequent parser engines. Each parser engine also includes a counter, which is incremented whenever a packet enters the parser engine and is decremented whenever a packet exists the parser engine. A packet bypasses the parser engine based on the counter of the parser engine and the status information of that packet.

In one aspect, a method of implementing a parser engine is provided. The method includes receiving data, wherein the data includes an incoming packet and status information regarding the incoming packet, and determining whether the status information indicates a first status. In some embodiments, the first status is parsing completed.

The method also includes, based on the determination that the status information indicates the first status, transmitting the data via a first route of the parser engine when the parser engine is not currently processing one or more other packets. In some embodiments, the first route is a bypass route to send the incoming packet through the parser engine without being processed by the parser engine.

In some embodiments, the method also includes based on the determination that the status information indicates the first status, waiting to transmit the data via the first route of the parser engine when the parser engine is currently processing one or more other packets.

In some embodiments, the method also includes based on the determination that the status information does not indicate the first status, transmitting the incoming packet via a second route of the parser engine. In some embodiments, the second route is a processing route to process the incoming packet. In some embodiments, the method also includes updating the status information after the parser engine processes the incoming packet.

In some embodiments, the method also includes maintaining a counter, wherein the counter is incremented each time a packet enters the parser engine and is decremented each time a packet exits the parser engine. In some embodiments, the counter is used to determine whether the parser engine is busy processing other packets.

In another aspect, a method of implementing a parser engine is provided. The method includes maintaining a counter per source port and receiving data, wherein the data includes an incoming packet and status information regarding the incoming packet.

The method also includes determining whether the status information indicates a first status. In some embodiments, the first status is parsing completed.

The method also includes based on the determination that the status information indicates the first status, transmitting the data via a first route of the parser engine when the parser engine is not currently processing one or more other packets that are also identified with a same port as the incoming packet is identified with. In some embodiments, the first route is a bypass route to send the incoming packet through the parser engine without being processed by the parser engine.

In some embodiments, the method also includes based on the determination that the status information indicates the first status, waiting to transmit the data via the first route of the parser engine when the parser engine is currently processing one or more other packets that are also identified with a same port as the incoming packet is identified with.

In some embodiments, the method also includes based on the determination that the status information does not indicate the first status, transmitting the incoming packet via a second route of the parser engine. In some embodiments, the second route is a processing route to process the incoming packet. In some embodiments, the method also includes, prior to transmitting the incoming packet via the second route, incrementing the counter associated with the source port that the incoming packet is identified with. In some embodiments, the method also includes, after transmitting the incoming packet via the second route, determining whether parsing of the incoming packet is completed and decrementing the counter associated with the source port that the incoming packet is identified with.

In yet another aspect, a method of a parser is provided. The parser includes a plurality of parser engines in a series. The method includes sending data through each of the plurality of parser engines, wherein the data includes an incoming packet and status information of the incoming packet.

The method also includes each of the plurality of parser engines determining whether to send the data through the parser engine based on a first event and a second event occurring. In some embodiments, the first event is processing completed, and the second event is the parser engine is currently not busy processing one or more other packets The method also includes each of the plurality of parser engines determining whether to process the incoming packet based on a third event occurring. In some embodiments, the third event is processing incomplete.

In some embodiments, the method also includes each of the plurality of parser engines maintaining a counter, wherein the counter is incremented each time a packet enters the parser engine and is decremented each time a packet exits the parser engine.

In some embodiments, the method also includes each of the plurality of parser engines maintaining a counter per source port, wherein the counter associated with the source port is incremented each time a packet that is identified with source port enters the parser engine and is decremented each time a packet that is identified with source port exits the parser engine.

In yet another aspect, a parser is provided. The parser includes a plurality of parser engines. In some embodiments, each of the parser engines is stateless. Typically, each parser engine includes a processing route, wherein the processing route processes incoming packets, and a bypass route, wherein the bypass route sends incoming packets through the parser engine without being processed by the parser engine. An incoming packet entering the parser engine is transmitted via the processing route or the bypass route depending a status of the incoming packet and a status of the parsing engine.

In some embodiments, when the status of the incoming packet is parsing incomplete, the incoming packet is transmitted via the processing route and the status is thereafter updated.

In some embodiments, when the status of the incoming packet is parsing complete and the status of the parsing engine is not currently processing one or more other packets, the incoming packet is transmitted via the bypass route.

In some embodiments, when the status of the incoming packet is parsing complete and the status of the parsing engine is currently processing one or more other packets, the incoming packet is transmitted via the bypass route after the parser engine is finished processing the one or more other packets.

In some embodiments, when the status of the incoming packet is parsing completed and the status of the parsing engine is not currently processing one or more other packets that are identified with a same source port as the incoming packet is identified with, the incoming packet is transmitted via the bypass route.

In some embodiments, when the status of the incoming packet is parsing completed and the status of the parsing engine is currently processing one or more other packets that are identified with a same source port as the incoming packet is identified with, the incoming packet is transmitted via the bypass route after the parser engine is finished processing the one or more other packets.

In some embodiments, each parser engine also includes a counter, wherein the counter is incremented each time a packet enters the parser engine and is decremented each time a packet exits the parser engine. Alternatively, each parser engine also includes a counter per port, wherein the counter is incremented each time a packet that is identified with the associated port enters the parser engine and is decremented each time a packet that is identified with the associated exits the parser engine.

In yet another aspect, a parser is provided. The parser includes a plurality of parser engines. Typically, each parser engine includes memory, wherein the memory stores bypass information of packets. Each parser engine also includes at least one counter to keep track of a number of packets currently being processed by the parser engine. Each parser engine also includes a processing route, wherein the processing route processes packets. Each parser engine also includes a bypass route, wherein the bypass route sends packets through the parser engine without being processed by the parser engine, wherein a packet entering the parser engine is transmitted via the processing route or the bypass route depending a status of the packet and a status of the parsing engine. In some embodiments, the status of the parsing engine depends on the at least one counter.

In some embodiments, the bypass route is formed by a TCAM and a SRAM, wherein the SRAM stores bypass data and the status of the packet.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Embodiments of the apparatus for reducing latency in a flexible parser relate to an implementation that optimizes each parser engine within the parser. A packet enters the parser. Each of the parser engines processes the packet if processing is required. Otherwise, the parser engine simply forwards the packet through without processing the packet, thereby reducing latency. Each parser engine includes a memory. The memory stores bypass data and status information that indicates whether parsing for this packet is completed and, thus, no further processing is required by subsequent parser engines. Each parser engine also includes a counter, which is incremented whenever a packet enters the parser engine and is decremented whenever a packet exists the parser engine. A packet bypasses the parser engine based on the counter of the parser engine and the status information of that packet.

A network device, such as a network switch, is able to switch/route network traffic. The network switch includes at least one input/incoming port and at least one output/outgoing port for receiving and transmitting packets. In some embodiments, the network switch also includes a parser and a rewriter. The parser can include one or more parser engines to identify contents of network packets, and the rewriter can include one or more rewrite engines to modify packets before they are transmitted out from the network switch. The parser engine(s) and the rewrite engine(s) are flexible and operate on a programmable basis.

Figure 2:
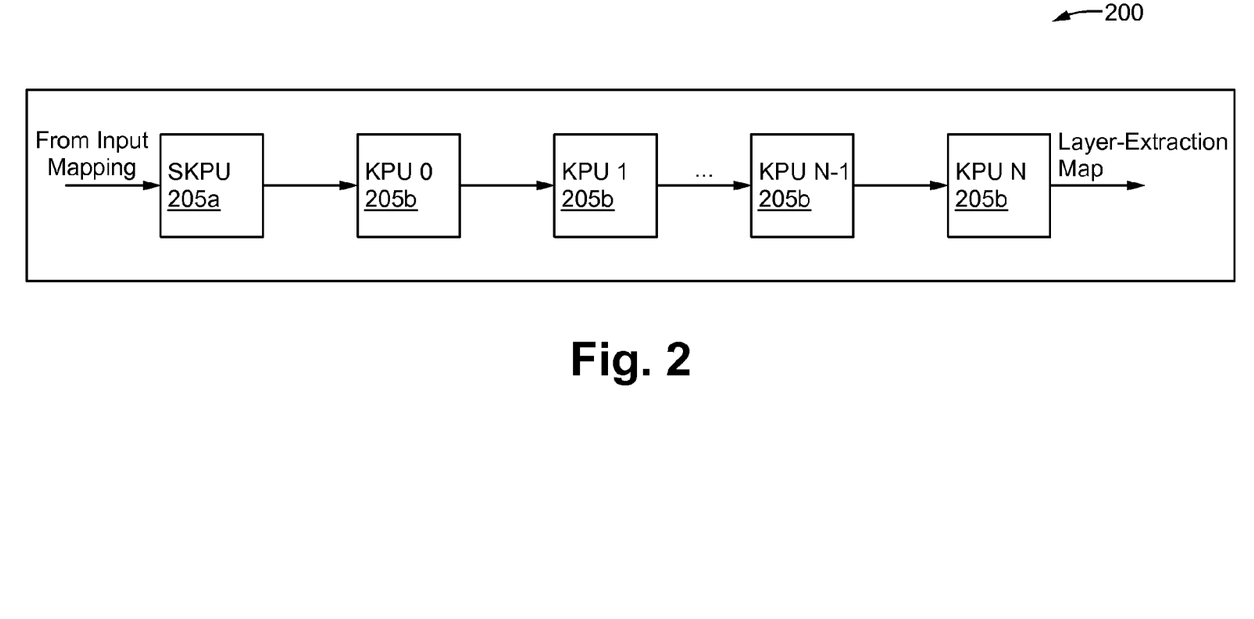
FIG. 2 illustrates a block diagram of an exemplary parser in accordance with some embodiments of the present invention.

FIG. 2 illustrates a block diagram of an exemplary parser 200 in accordance with some embodiments of the present invention. Briefly, the parser 200 typically uses a combination of TCAM (ternary content addressable memory) and memories, such as SRAM (static random access memory) to identify, to look up fields in a packet.

The parser 200 includes a plurality of parser engines 205 in a series. The plurality of parser engines 205 includes at least one SKPU 205a and a plurality of KPUs 205b. In some embodiments, each of the parser engines 205 is stateless.

In some embodiments, incoming data to the parser 200 is from an input mapping, while outgoing data from the parser 200 is to a layer-extraction mapping. In some embodiments, the input mapping maps a network stream to a parser. In some embodiments, the layer extraction mapping is used by other hardware engines of the network switch.

Figure 3:
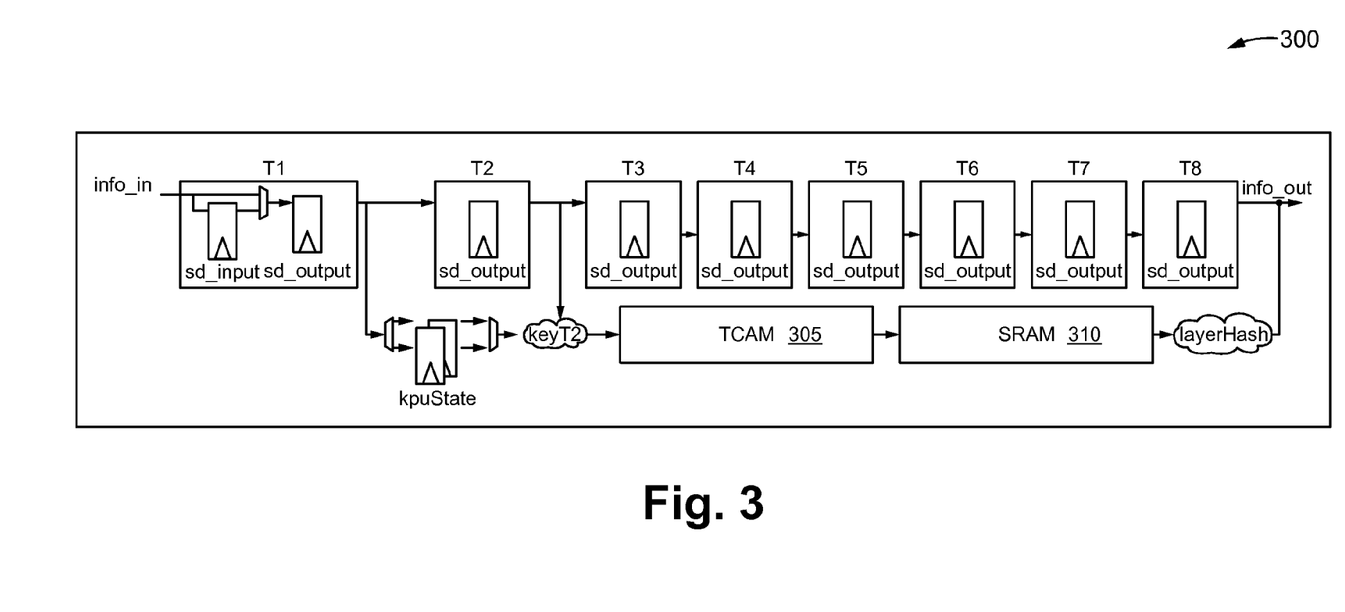
FIG. 3 illustrates a block diagram of a parser engine in accordance with some embodiments of the present invention.

FIG. 3 illustrates a block diagram of a parser engine 300 in accordance with some embodiments of the present invention. In some embodiments, each of the parser engines 205 of FIG. 2 is similarly configured as the parser engine 300. The parser engine 300 includes a processing path, which has eight clocks of latency, although there may be more or less clocks of latency, depending on hardware constraints and requirements. The parser engine 300 includes a bypass path that is formed by a TCAM 305 and a SRAM 310. Within the parser engine 300, the SRAM 310 stores bypass data and status information of a packet. The status information indicates whether parsing for this packet is completed and, thus, no further processing is required by subsequent parser engines.

The parser engine 300 also includes a counter. The counter is incremented whenever a packet enters the parser engine and is decremented whenever a packet exists the parser engine. An exemplary pseudo-code for this counter is shown in Table 1.

TABLE 1

If (packet_enter)
    curCnt ++;
if (packet_exit)
    curCnt --;

The packet count and the status information (e.g., whether parsing is done) from the previous stage are both used to bypass the parser engine 300, which is reflected in an exemplary pseudo-code shown in Table 2.

Figure 4:
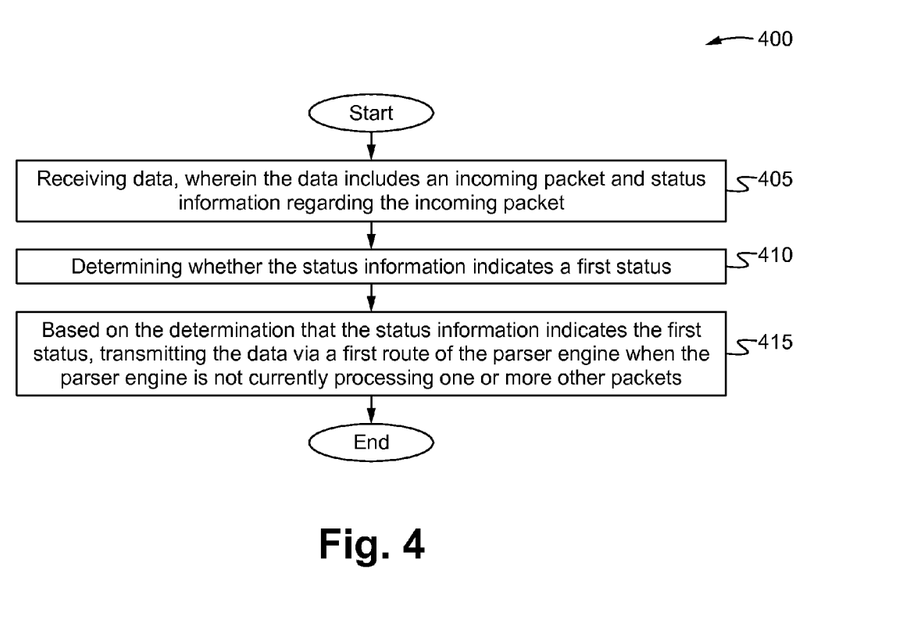
FIG. 4 illustrates a method of a parser engine in accordance with some embodiments of the present invention.

TABLE 2 if (packet_enter && (curCnt == 0) && packet_parsing_done)
    output_packet = input_packet;

FIG. 4 illustrates a method 400 of the parser engine in accordance with some embodiments of the present invention. At a step 405, data is received. The data includes an incoming packet and status information regarding the incoming packet. The status information typically indicates whether parsing of the incoming packet is completed.

At a step 410, it is determined whether the status information indicates a first status. The first status is parsing completed or done from the previous stage.

At a step 415, based on the determination that the status information indicates the first status, the data is transmitted via a first route of the parser engine when the parser engine is not currently processing one or more other packets. In some embodiments, a counter is maintained. The counter is incremented each time a packet enters the parser engine and is decremented each time a packet exits the parser engine. In some embodiments, the counter is used to determine whether the parser engine is busy processing other packets. In some embodiments, the first route is a bypass route to send the incoming packet through the parser engine without being processed by the parser engine.

Based on the determination that the status information indicates the first status, when the parser engine is currently processing one or more other packets, the data is transmitted via the first route of the parser engine after the parser engine is finished processing the one or more other packets.

Based on the determination that the status information does not indicate the first status, the incoming data is transmitted via a second route of the parser engine. The second route is a processing route to process the incoming packet. The status information is updated after the parser engine processes the incoming packet.

In some embodiments, the parser is able to handle multiple source ports. A slightly more costly implementation, yet more effective, is to maintain a counter per source port rather than a single counter for all source ports. Since there are no constraints on reordering of packets across source ports, this implementation allows the parser engine to be bypassed even if that parser engine is processing packets from other unrelated ports, which is reflected in an exemplary pseudo-code shown in Table 3.

TABLE 3

Figure 5:
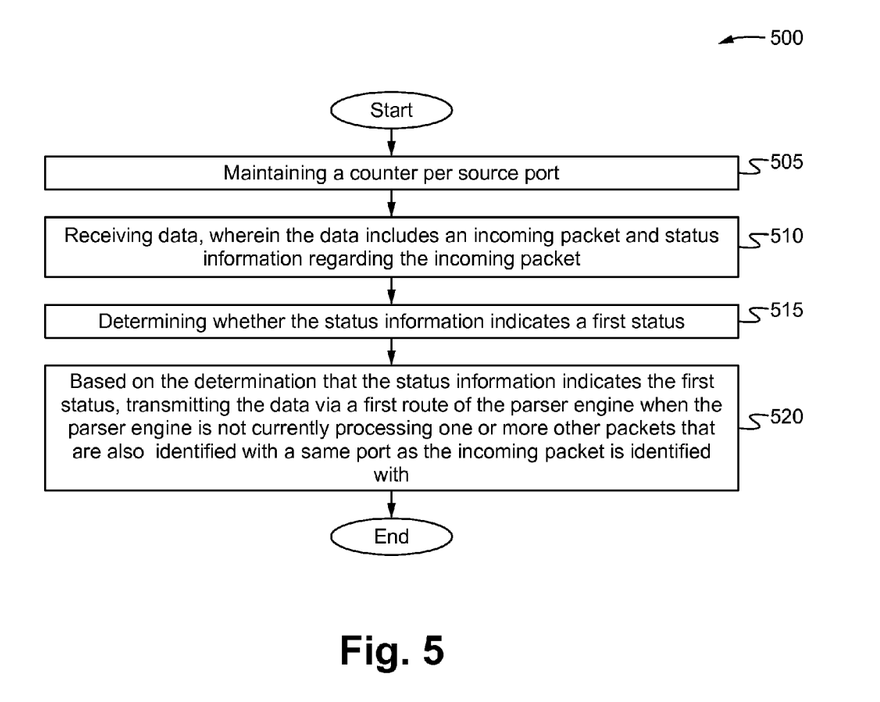
FIG. 5 illustrates another method of the parser engine in accordance with some embodiments of the present invention.

If (packet_enter)
    curCnt[port] ++;
if (packet_exit)
    curCnt[port] --;
if (packet_enter && (curCnt[port] == 0) && packet_parsing_done)
    output_packet = input_packet;

FIG. 5 illustrates another method 500 of the parser engine in accordance with some embodiments of the present invention. At a step 505, a counter per source port is maintained.

At a step 510, data is received. The data includes an incoming packet and information regarding the incoming packet. The information includes status information regarding the incoming packet. The status information indicates whether parsing is completed or done from the previous stage.

At a step 515, it is determined whether the status information indicates a first status. The first status is parsing completed.

At a step 520, based on the determination that the status information indicates the first status, the data is transmitted via a first route of the parser engine when the parser engine is not currently processing one or more other packets that are also identified with a same port as the incoming packet is identified with. In some embodiments, the counter associated with the source port that the incoming packet is identified with is used to determine whether the parser engine is busy processing other packets that are identified with the source port. The first route is a bypass route to send the incoming packet through the parser engine without being processed by the parser engine.

Based on the determination that the status information indicates the first status, when the parser engine is currently processing one or more other packets that are also identified with the same port as the incoming packet is identified with, the data is transmitted via the first route of the parser engine after the parser engine is finished processing the one or more other packets.

Based on the determination that the status information does not indicate the first status, the incoming packet is transmitted via a second route of the parser engine. The second route is a processing route to process the incoming packet. Prior to transmitting the incoming packet via the second route, the counter associated with the source port that the incoming packet is identified with is incremented. After transmitting the incoming data via the second route, it is determined whether parsing of the incoming packet is completed and the counter associated with the source port that the incoming packet is identified with is decremented.

Figure 6:
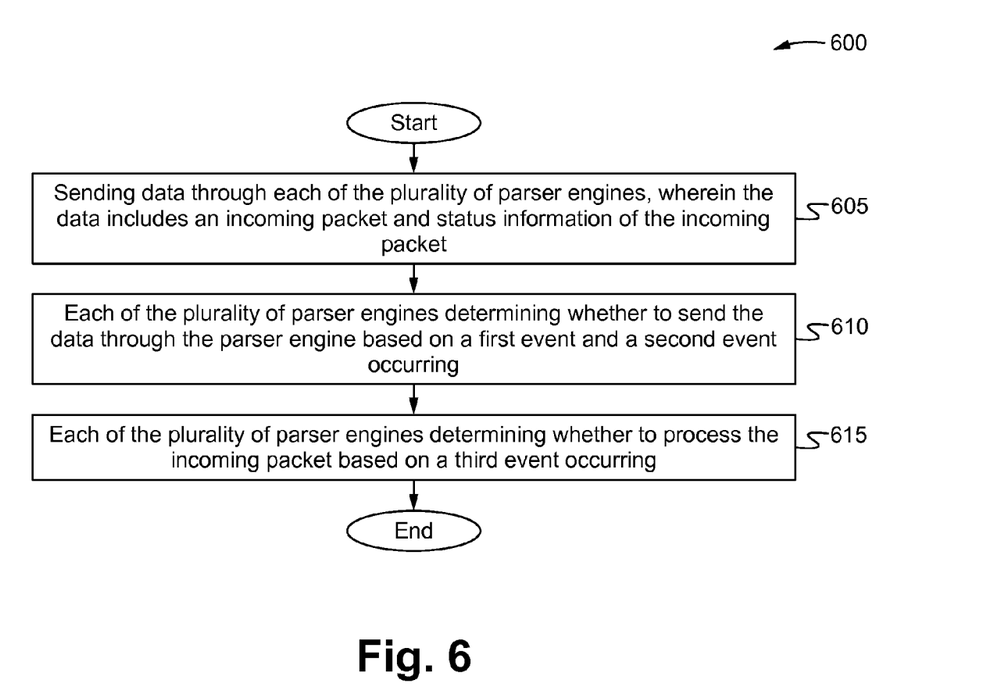
FIG. 6 illustrates a method of a parser in accordance with some embodiments of the present invention.

FIG. 6 illustrates a method 600 of the parser in accordance with some embodiments of the present invention. The parser includes a plurality of parser engines in a series. At a step 605, data is sent through each of the plurality of parser engines. The data typically includes an incoming packet and status information of the incoming packet.

At a step 610, each of the plurality of parser engines determines whether to send the data through the parser engine based on a first event and a second event occurring. The first event is processing completed and the second event is the parser engine is currently not busy processing one or more other packets.

At a step 615, each of the plurality of parser engines determines whether to process the incoming packet based on a third event occurring. The third event is processing incomplete.

In some embodiments, each of the plurality of parser engines maintains a counter. The counter is incremented each time a packet enters the parser engine and is decremented each time a packet exits the parser engine. Alternatively, each of the plurality of parser engines maintains a counter per source port. The counter associated with the source port is incremented each time a packet that is identified with source port enters the parser engine and is decremented each time a packet that is identified with source port exits the parser engine. In some embodiments, the second event is determined based on the counter.

One of ordinary skill in the art will realize other uses and advantages also exist. While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A method of implementing a series of parser engines, the method comprising:
    parsing a packet with a first parser engine;
    receiving data from the first parser engine at a second parser engine, wherein the data includes the packet and status information regarding the packet;
    determining with the second parser engine whether the status information indicates a first status that parsing has been completed for the packet via one or more previous parses by one or more other parser engines or a second status that parsing is not complete for the packet;
    outputting the packet from the second parser engine via a first route without parsing the packet with the second parser engine based on at least if the status information indicated the first status;
    parsing the packet with the second parser engine if the status information indicated the second status; and
    based on the determination that the status information indicates the first status, waiting to transmit the data via the first route of the second parser engine when the second parser engine is currently processing one or more other packets identified with a same port as an incoming packet.

2. The method of claim 1, wherein the first route is a bypass route to send the incoming packet through the second parser engine without being parsed by the second parser engine.

3. The method of claim 1, further comprising updating the status information after the second parser engine parses the incoming packet.

4. The method of claim 1, further comprising maintaining a counter within the second parser engine, wherein the counter is incremented each time a packet enters the second parser engine and is decremented each time a packet exits the second parser engine.

5. The method of claim 4, wherein the counter is used to determine whether the second parser engine is busy processing other packets.

6. A method of implementing a parser engine, the method comprising:
    maintaining a plurality of counters within a parser engine, wherein each of the plurality of counters is associated with a different source port of a plurality of source ports;
    with each of the counters, determining if one or more packets from the source port associated with the counter are currently being processed by the parser engine by counting a difference between a number of packets from the associated source port input by the parser engine and a number of packets from the associated source port output by the parser engine;
    receiving data with the parser engine, wherein the data includes an incoming packet having a header and status information regarding the incoming packet;
    determining with the parser engine whether the status information indicates a first status that parsing has been completed for the packet via one or more previous parses by one or more other parser engines or a second status that parsing is not complete for the packet, wherein the outputting of the packet from the parser engine is via a first route and is further based on if the status information indicated the first status;
    parsing the packet with the parser engine via a second route based on if the status information indicated the second status;
    when the data including the header is ready to be output by the parser engine but was not parsed by the parser engine:
        refraining from outputting the data from the parser engine if the counter associated with the source port from which the data was transmitted indicates that one or more other packets from the source port from which the data was transmitted are still currently being processed by the parser engine; and
        outputting the data from the parser engine based on the counter of the source port from which the data was transmitted indicating that no packets from the source port from which the data was transmitted are currently being processed by the parser engine, wherein the one or more other packets have a header and a payload.

7. The method of claim 6, wherein the first route is a bypass route to send the incoming packet through the parser engine without being parsed by the parser engine.

8. The method of claim 6, wherein the second route is a processing route to parse the incoming packet.

9. The method of claim 6, further comprising, prior to transmitting the incoming packet via the second route, incrementing the counter associated with the source port that the incoming packet is identified with.

10. The method of claim 6, further comprising, after transmitting the incoming packet via the second route, determining whether parsing of the incoming packet is completed and decrementing the counter associated with the source port that the incoming packet is identified with.

11. A method of a parser including a plurality of parser engines in a series, the method comprising:
sending data serially through each of the plurality of parser engines, wherein the data includes an incoming packet and status information of the incoming packet;
determining with one of the plurality of parser engines whether the status information indicates a first status that parsing has been completed for the packet via one or more previous parses by one or more other of the plurality of parser engines or a second status that parsing is not complete for the packet; and
based on the determination that the status information indicates the first status, waiting to transmit the data via a first route of the one of the plurality of parser engines when the one of the plurality of parser engines is currently processing one or more other packets identified with a same port as an incoming packet;
wherein upon receiving the data:
each of the plurality of parser engines determines whether not to parse the data based on a first status and a second status;
each of the plurality of parser engines determines whether to parse the incoming packet based on a third status; and
each of the plurality of parser engines maintains a counter per source port, wherein the counter associated with the source port is incremented each time a packet that is identified with the source port enters the parser engine and is decremented each time a packet that is identified with the source port exits the parser engine.

12. The method of claim 11, wherein the first status is parsing completed, the second status is the parser engine is currently not busy processing one or more other packets, and the third status is parsing incomplete.

13. The method of claim 11, further comprising each of the plurality of parser engines maintaining a counter, wherein the counter is incremented each time a packet enters the parser engine and is decremented each time a packet exits the parser engine.

14. A non-transitory computer-readable medium storing a parser comprising a plurality of parser engines, wherein each parser engine includes:
a processing route through the parser engine, wherein the processing route parses incoming packets with the parser engine; and
a bypass route through the parser engine, wherein the bypass route sends the incoming packets through the parser engine without being parsed by the parser engine, wherein an incoming packet of the incoming packets entering the parser engine is transmitted via the processing route or the bypass route depending a status of the incoming packet and a status of the parsing engine;
wherein when the status of the incoming packet is parsing completed and the status of the parsing engine is currently processing one or more other packets that are identified with a same source port as the incoming packet is identified with, the incoming packet is transmitted via the bypass route after the parser engine is finished processing the one or more other packets.

15. The non-transitory computer-readable medium of claim 14, wherein each of the parser engines is stateless.

16. The non-transitory computer-readable medium of claim 14, wherein when the status of the incoming packet is parsing incomplete, the incoming packet is transmitted via the processing route and the status of the incoming packet is thereafter updated.

17. The non-transitory computer-readable medium of claim 14, wherein when the status of the incoming packet is parsing complete and the status of the parsing engine is not currently processing one or more other packets, the incoming packet is transmitted via the bypass route.

18. The non-transitory computer-readable medium of claim 14, wherein when the status of the incoming packet is parsing complete and the status of the parsing engine is currently processing one or more other packets, the incoming packet is transmitted via the bypass route after the parser engine is finished processing the one or more other packets.

19. The non-transitory computer-readable medium of claim 14, wherein when the parser engine determines the status of the incoming packet is parsing completed and determines the status of the parsing engine is not currently processing one or more other packets that are identified with a same source port as the incoming packet is identified with, the incoming packet is transmitted via the bypass route.

20. The non-transitory computer-readable medium of claim 14, wherein each parser engine also includes a counter, wherein the counter is incremented each time a packet enters the parser engine and is decremented each time a packet exits the parser engine.

21. The non-transitory computer-readable medium of claim 14, wherein each parser engine also includes a counter per port, wherein the counter is incremented each time a packet that is identified with the associated port enters the parser engine and is decremented each time a packet that is identified with the associated port exits the parser engine.

22. A parser comprising a plurality of parser engines, wherein each parser engine includes:
memory, wherein the memory stores bypass information of packets;
at least one counter that tracks a number of packets currently being processed by the parser engine;
a processing route, wherein the processing route parses packets with the parsing engine; and
a bypass route, wherein the bypass route sends packets through the parser engine without being parsed by the parser engine, wherein a packet entering the parser engine is transmitted via the processing route or the bypass route depending a status of the packet and a status of the parsing engine;
wherein when the status of the incoming packet is parsing completed and the status of the parsing engine is currently processing one or more other packets that are identified with a same source port as the incoming packet is identified with, the incoming packet is transmitted via the bypass route after the parser engine is finished processing the one or more other packets.

23. The parser of claim 22, wherein the status of the parsing engine depends on the at least one counter.

24. The parser of claim 22, wherein the bypass route is formed by a ternary content addressable memory (TCAM)

and a static random access memory (SRAM), wherein the SRAM stores bypass data and the status of the packet.

* * * * *